Aug. 25, 1942.   J. B. SEASTONE ET AL   2,293,951
INDUCTION APPARATUS AND METHOD OF CORE CONSTRUCTION THEREFOR
Filed Sept. 20, 1939
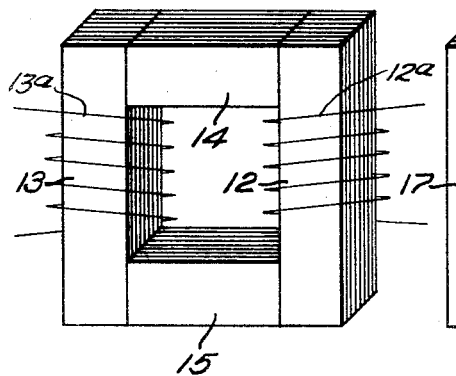
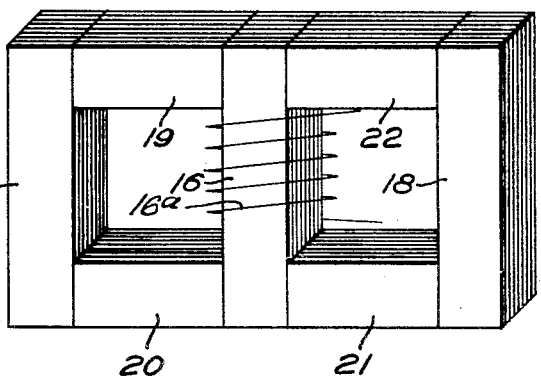
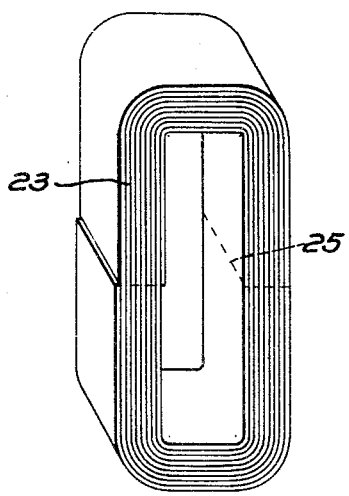
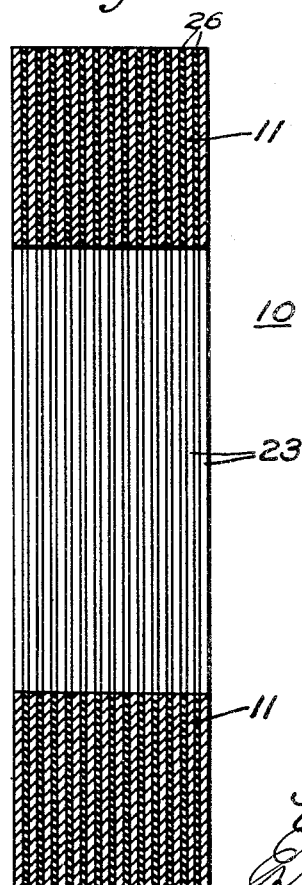
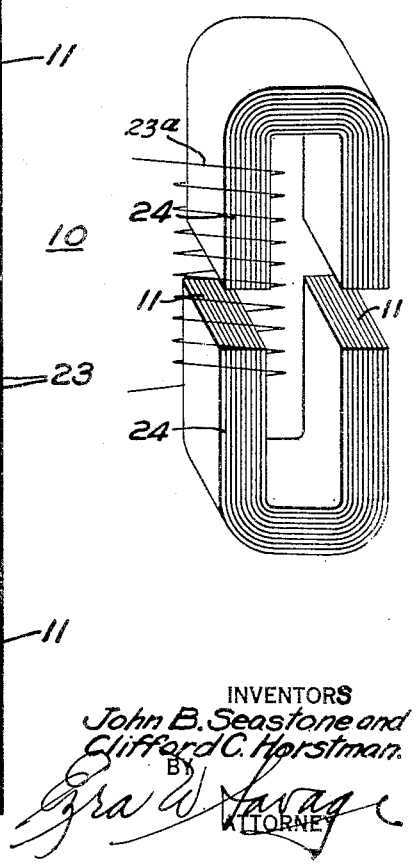
INVENTORS
John B. Seastone and
Clifford C. Horstman.

Patented Aug. 25, 1942

2,293,951

UNITED STATES PATENT OFFICE 2,293,951

INDUCTION APPARATUS AND METHOD OF CORE CONSTRUCTION THEREFOR

John B. Seastone, Wilkinsburg, and Clifford C. Horstman, Swissvale, Pa., assignors to Westinghouse Electric & Manufacturing Company, East Pittsburgh, Pa., a corporation of Pennsylvania Application September 20, 1939, Serial No. 295,750

7 Claims. (Cl. 175—21)

The invention relates generally to induction apparatus, and more particularly to core structures with low reluctance and low loss butt joints.

An object of the invention is to provide a low reluctance and low loss butt joint which will enable the building of core structures from stacks or bundles of laminations of predetermined shapes.

It is also an object of the invention to provide a core structure comprising a plurality of laminations of magnetic material having a worked face of predetermined contour, the laminations being properly insulated from one another.

The invention accordingly is disclosed in the embodiments thereof shown in the accompanying drawing, and comprises the features of construction, combination of elements, and arrangement of parts which will be exemplified in the constructions hereinafter set forth and the scope of the application of which will be indicated in the claims.

For a fuller understanding of the nature and objects of the invention, reference should be had to the following detailed description taken in connection with the accompanying drawing, in which:

Figure 1 is a diagrammatic perspective view of a core-type transformer having a core structure built in accordance with the teachings of this invention;

Fig. 2 is a diagrammatic perspective view of a shell-type transformer having a core structure embodying the same features as Fig. 1;

Fig. 3 is an enlarged view, partly in cross-section and partly in elevation, of a stack or bundle of laminations made in accordance with the teachings of the invention;

Fig. 4 is a perspective view of a spirally wound core before it is cut to facilitate assembly of the complete core and coils of a transformer; and Fig. 5 is a perspective view showing a transformer or induction-device with the core illustrated in Fig. 4 after it has been cut and the parts separated to receive the coils, but before the core-parts have been put together again.

Referring now to the drawing and Fig. 3 in particular, a stack 10 of laminated magnetic material is illustrated with a plurality of faces 11 prepared for the making of laminated butt joints of low reluctance and low loss. The faces 11 may be of any predetermined size or contour depending on the use for which the stack is to be employed.

In building core structures such as the core type and shell type transformer core structures illustrated in Figs. 1 and 2, the faces worked on the stacks of laminations of magnetic material 10 will be so located on the stacks as to fit together in a closely fitting butt joint when assembled. Referring to Fig. 1, the core stacks 12 and 13 have faces worked on one side near their ends, while the stacks 14 and 15 have faces worked on their ends. Therefore, when the stacks are assembled the faces worked on the sides of the stacks 12 and 13 will be assembled in abutting relation with the faces worked on the ends of the stacks 14 and 15. In assembling the core-type transformer or induction-device shown in Fig. 1, the coil or coils 12a and/or 13a, having first been preformed, or bent, wound and insulated in their proper final shape before assembly, are slipped on the core-legs 12 and/or 13, after which the outer or remaining core-legs 14 and 15 are assembled, and the butt joints of the core are brought tightly together, making a continuous magnetic loop.

In the shell type core structure illustrated in Fig. 2, the center member 16 has faces worked on both sides at the ends while the members 17 and 18 have faces worked only on one side. The members 19, 20, 21 and 22 are similar to members 14 and 15 of Fig. 1, having faces worked on their ends only. The shell-type transformer or induction-device shown in Fig. 2 provides two continuous magnetic loops 16—20—17—19 and 16—21—18—22, which are assembled after the preformed coil or coils 16a have been placed on one or more of the core-parts, as illustrated.

The modified type of core illustrated in Figs. 4 and 5 comprises a strip of magnetic material wound continuously to provide a plurality of laminations 23. After the core has been wound to a predetermined shape, it is then cut, along line 25, into two U-shaped members 24, as illustrated, with the laminations bent flatwise at the bends in the U, the cut ends presenting a plurality of faces 11 on each of the U-shaped members. The U-shaped members 24 are, in effect, stacks or bundles of laminations similar to the I-shaped stacks 12 to 22, and will be worked and treated in exactly the same manner as will be described hereinafter. After the faces of the U-shaped members have been worked and treated in the manner to be described hereinafter they may be assembled with preformed coils such as shown diagrammatically at 23a.

It will be readily appreciated that in the manufacture of core structures, stacks of laminated magnetic material of any predetermined shape may be made and faces of any predetermined size and contour may be worked on them.

Referring now to Fig. 3, a plurality of stacks of laminations 23 of magnetic material which may be of any predetermined shape are assembled. In order to provide accurately smooth faces 11 on this stack which will cooperate with corresponding faces on other stacks to give the desired closely fitting butt joint, these faces are either machined or ground, or otherwise mechanically worked, to present an accurately smooth surface which may be either a substantially true plane surface or a surface of any predetermined contour. It has been found that during the machining or grinding operations to provide the faces 11, burrs are formed. These burrs extend from one lamination to the other, thereby electrically connecting or short-circuiting the adjacent laminations. Such electrical connections, if they are not removed, will result in high eddy currents and consequent high losses in the induction-device.

Each piece of the core-structure is assembled with the magnetizable laminations 23 electrically insulated from each other, and solidly held together, with intervening bonding-layers of an adherent insulating bond 26 between the laminations, as shown in Fig. 3. This bond is preferably a chemically inert material, such, for example, as one of the well known resinous products, which is applied to the laminations 23. This chemically inert material may be applied to only the portions of the laminations which are to be worked. When the chemically inert material is so applied, it will appear between the laminations back of the faces 11.

The chemically inert material 26 may be applied in many ways. It has been found satisfactory to dip the laminations before they are wound or stacked, or after the winding or stacking operation has been completed only that portion of the bundle on which a face is to be worked may be dipped in a suitable chemically inert adherent bonding material. In some instances the chemically inert material may be applied to the sheet metal by roll coating or other well known methods. In the case of the continuously wound core, the inert material may be applied before the magnetic strip is wound to make the core. The resin may also be applied by vacuum pressure impregnation of the stacks or continuously wound coil cores in accordance with well known practice. The method employed will depend greatly on the manufacturing procedure to be utilized.

In practice, it has been found satisfactory to utilize a resinous product such as a condensation product of the phenol aldehyde type. To meet different conditions, the phenol aldehyde type resin may be modified by methods well known in the art.

The resin may be applied in its unreacted state, air dried, allowing the reaction to proceed and then subjected to heat to complete the reaction. When a chemically inert material is applied in this manner, it strongly adheres to both of the laminations between which it is disposed whereby the bundle of laminations is solidly held together in a rigid piece. The adherent bond 26 thus holds the laminations in position during the working of the faces, so that it is mechanically feasible to make the abutting surfaces substantially smooth and true, or unwarped planes, or other accurately fitting, matched surfaces, so that the abutting surfaces will be capable of fitting so closely together as to have substantially no intervening space between any opposed portions of the two abutting surfaces, as distinguished from the relative large air-gap effect which is obtained between abutting core-sections having unworked faces. The adherent bond 26 also retains the lamination-ends against individual flexings or bending during the processes of sawing, machining, grinding, or other mechanical working for producing the accurately matched or prepared butt-joint surfaces. The adherent bond 26 further retains the laminations in position when assembled in the complete electrical apparatus.

When the core members are utilized to build transformers as illustrated in the drawing, in some instances it may be desirable to utilize the well known end frames to clamp the stacks in predetermined positions relative to one another. These end frames will assure that there will be no separation of the laminations even if the resin is affected by the dielectric in which the cores are immersed, or by other operating conditions, or even by weak bonding by the resin. The end frames have not been illustrated since they are so well known in the art.

After the stack has been made from laminations that have been treated with a chemically inert adherent bonding material, or from untreated laminations which are treated after assembly, the faces 11 are machined or ground depending upon the most suitable method for shop practice. The machining or grinding operation, or other equivalent mechanical working, is needed in order to produce a really closely fitting butt joint so as to avoid the introduction of any material air-gap in the magnetic circuit, which would increase the magnetizing current of the transformer. In some instances, in the preparation of the laminations, as is always the case when utilizing the continuously wound core, it may be desirable to cut them after they have been stacked. In such instances, the faces may be finished on the ends of the cut portions by grinding.

In any laminated core, the laminations must extend lengthwise in the direction of the magnetic flux-path, so that the striated or laminated structure is provided in opposition to the electrical eddy-currents which tend to run transversely with respect to the flux-path. Hence the surfaces 11 of the butt joints must cut across the laminations, so as to be disposed at an angle to the planes of the laminations, so that each of said butt-joint surfaces comprises a plurality of strata consisting of smooth-surfaced ends of the successive individual laminations 23, separated by the insulating bonding-layers 26, as plainly shown in Fig. 3.

The mechanical working, which is necessary in order to obtain an accurately smooth abutting-surface which is substantially a true plane, inevitably produces a certain number of short-circuiting burrs, or tiny slivers of the magnetizable material, which span the bonding-layers at said mechanically worked surface, thus partially defeating the object in laminating the magnetic circuit, and increasing both the iron losses and the magnetizing current of the electrical apparatus. In order to make the butt-joint laminated core a commercially acceptable device, it is necessary, therefore, to remove these burrs.

The applicants prefer to remove the burrs by briefly applying an etching solution to the faces in any suitable manner. Further, many different kinds of etching solutions may be employed with equal success. It has been found in practice that a 30% nitric acid solution is highly satisfactory. Other acid solutions such as hydrochloric and sulphuric have been employed with success.

The etching solution may be applied in any suitable manner commensurate with the objects in view. The applicants have found it good practice to dip the face to be etched in the nitric acid solution for about 30 seconds. When the faces are withdrawn from the nitric acid, it is desirable to apply sodium carbonate to neutralize the acid. When the acid remaining on the stack has been neutralized, water is applied to remove the products resulting from the neutralizing process. In some instances, it has been found desirable to apply alcohol to the face to effect a process of dehydration. The above-described lightly etched treatment of the worked faces removes the burrs without substantially roughening the accurately smooth plane face or face of other contour substantially in accordance with the machining or grinding.

Generally, it is desirable to so etch the laminations that only the burrs are removed. However, it has been found in some instances desirable to remove portions of the edges of the worked lamination-ends which have been put under stress in the process of cutting, grinding, machining, or other mechanical working. Therefore, the etching may be utilized to remove enough of the edge-portions of the lamination-ends to remove the edge-material under stress as well as the burrs, or the etching may be utilized to remove only enough material from the adjoining edges of the respective smooth-surfaced lamination-ends to leave substantially no short-circuiting burrs of the magnetizable material extending between successive laminations at the mechanically worked surface. In any case, the etching is not carried far enough to substantially impair the smooth finish on the main portion of each smooth-surfaced lamination-end.

When the burrs are removed by an acid-etching process, as just described, the use of a chemically inert or acid-resistant insulating-material 26 is desirable. The use of acid also makes it extremely desirable that said insulating-material 26 shall be an adherent bond which adheres to both of the laminations between which it is disposed, thereby preventing the creepage of acid in the capillary spaces which would otherwise exist between the laminations or between non-adhering coatings on the laminations. If such capillary spaces exist, the acid used for etching penetrates so deeply into said spaces that it is difficult to completely neutralize it or wash it away afterwards, becoming a source or risk of future trouble in the transformer or other electrical device in which the butt-joint laminated core is utilized.

Even aside from the particular choice of acid-etching for burr-removal, the use of an adherent bond between successive laminations is a valuable expedient in making possible the successful cutting and grinding of the laminated core, because it holds the bundle of laminations firmly together in a solid non-slipping mass while these operations are being performed. The adherent bond supports, and strengthens or braces, the flimsy edges of the relatively thin laminations, so that they do not readily flex individually, or bend sideways, during either the cutting-operation or the grinding-operation.

The doubly adherent bond also prevents spreading of the laminations during the mechanical working of the butt-joint surfaces, and it also prevents such spread ends of opposing laminations, on opposite surfaces of the butt joint, from interleaving partway between each other, under the continuously maintained vibratory stress of countless repetitions of magnetizations and demagnetizations of the magnetizable core during successive cycles of the alternating current, thus avoiding the lamination short-circuiting which would result if such interleaving occurred.

The method of preparing faces for the making of butt joints described hereinbefore may be applied to the cores of other electrical apparatus. In assembling laminations for making pole pieces or rotors, they may be treated with an inert material worked and etched in the manner described hereinbefore.

Further, in applying the inert material, it has been found that in the making of certain cores, the expense of vacuum pressure impregnation of the stacks with the resin is warranted. Details of the vacuum pressure impregnation will not be described since such is well known in the art.

Tests made on butt joints having faces prepared in this manner reveal that the losses are low. It has been found that a butt joint made in accordance with this invention is about equivalent in reluctance to the insertion of a reluctance of less than a one mil gap in the magnetic circuit. Further, the losses resulting from a butt joint of this kind in a typical small transformer core structure, such as shown in Fig. 4, were about 3½% of the total losses. However, it is to be understood that the losses will vary for different joints.

It will be readily appreciated that butt joints may be made from stacks of laminations of different gauge. Further, in the interests of economy in metal, cores or transformers or other similar electromagnetic structures may be assembled with a higher density material in the central leg than in the yokes.

The stacks 10 made in accordance with this invention lend themselves to economy in mass production. They facilitate the preformed winding of the coils and the assembly of the outer portions of the core structure around the coils after the coils are wound in their proper shape. Further the stacks themselves may be assembled by semi-automatic machinery.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:

1. A core structure provided with a butt joint comprising in combination a plurality of stacks of laminated magnetic material of predetermined shape, faces worked on the stacks of laminations to constitute the elements of a butt joint, a chemically inert bonding material applied to the laminations and bonding them into a unit, the faces being lightly etched to remove parts which could electrically connect a plurality of laminations without substantially affecting the major portion of the worked surfaces, the chemically inert bonding material disposed on the laminations adjacent the faces serving to protect the laminations during etching and to restrict the amount of each lamination exposed during etching, the faces being so disposed on the stacks as to permit them to be utilized cooperatively in making a butt joint, the plurality of stacks being disposed in predetermined relationship to one another to provide a core of predetermined shape.

2. A magnetic core for electrical apparatus, comprising a solidly held bundle of laminations of magnetizable material with intervening bonding-layers of an adherent insulating bond between the laminations, each bonding-layer adhering to both of the laminations between which it is disposed whereby the bundle of laminations is solidly held together, said bundle of laminations having a mechanically worked surface at an angle to the planes of the laminations so that said mechanically worked surface comprises a plurality of strata consisting of smooth-surfaced lamination-ends, separated by insulating adherent bonding-layers, the worked surface being so etched as to provide a smooth finish on the main portion of each smooth-surfaced lamination-end and to leave substantially no short-circuiting burrs of the magnetizable material spanning the bonding-layers at said mechanically worked surface.

3. A magnetic core for electrical apparatus, comprising a plurality of separate pieces having a plurality of abutting joints between the separate pieces, each of the separate pieces of the core being a solidly held bundle of laminations of magnetizable material with intervening bonding-layers of an adherent insulating bond between the laminations, each bonding-layer adhering to both of the laminations between which it is disposed whereby the bundle of laminations is soldly held together to constitute one of the plurality of separate pieces of the core, each of said pieces having a plurality of accurately smooth butt-joint surfaces, each at an angle to the planes of the laminations, so that each of said butt-joint surfaces comprises a plurality of strata consisting of smooth-surfaced lamination-ends, separated by insulating adherent bonding-layers, the worked surface being so etched as to provide a smooth finish on the main portion of each smooth-surfaced lamination-end and to leave substantially no short-circuiting burrs of the magnetizable material spanning the bonding-layers at said butt-joint surface, each of said accurately smooth butt-joint surfaces of each separate piece of the core cooperating with a corresponding butt-joint surface of another core-piece in a closely fitting butt joint.

4. A method of making a magnetic core for an induction device, with a plurality of separate core-pieces having a plurality of closely fitting abutting joints between the separate pieces, said method comprising the steps of building the separate pieces each as a solidly held bundle of laminations of magnetizable material with intervening bonding-layers of an adherent insulating bond between the laminations, each bonding-layer adhering to both of the laminations between which it is disposed whereby the bundle of laminations is solidly held together to constitute one of the plurality of separate pieces of the core, mechanically working a plurality of accurately smooth butt-joint surfaces, each at an angle to the planes of the laminations, on each piece, so that each of said butt-joint surfaces comprises a plurality of strata consisting of smooth-surfaced lamination-ends separated by insulating adherent bonding-layers, said mechanical working operation being performed in such manner and under such conditions as to produce short-circuiting burrs of the magnetizable material spanning the bonding-layers at each butt-joint surface, and subsequently etching away substantially all of said short-circuiting burrs without substantially roughening the smooth-surfaced lamination-ends.

5. A method of making a magnetic core for an induction device, with one or more continuous magnetic loops, each loop comprising only two separate U-shaped pieces having abutting joints between the respective ends of the two pieces, said method comprising the steps of winding and bonding each continuous magnetic loop with a plurality of layers of a continuous strip of magnetizable lamination-material with intervening bonding-layers of an adherent insulating bond between the lamination-layers, each bonding-layer adhering to both of the lamination-layers between which it is disposed whereby the wound loop is solidly united in a rigid piece, subsequently cutting through both legs of the loop and mechanically working the cut surfaces of the legs so that each of said mechanically worked surfaces comprises a plurality of strata consisting of smooth-surfaced lamination-ends separated by insulating adherent bonding-layers, said mechanical working operation being performed in such manner and under such conditions as to produce short-circuiting burrs of the magnetizable material spanning the bonding-layers at each mechanically worked surface, and subsequently etching away substantially all of said short-circuiting burrs without substantially roughening the smooth-surfaced lamination-ends.

6. In a core for inductive apparatus, in combination, a stack of laminations of magnetic material, a bonding material applied to the laminations bonding them to one another forming a core unit, a face worked on the core unit to provide an element for making a butt joint, the face being so worked that it presents a smooth matching surface for the making of a butt joint and so etched as to be substantially completely free of burrs, and its matching-surface characteristics being substantially unaffected by the burr-removing etch.

7. A magnetic core for an induction device, said core comprising one or more continuous magnetic loops, each loop comprising only two separate U-shaped pieces having abutting joints between the respective ends of the two pieces, each of said U-shaped pieces being a solidly held bundle of thin pieces of magnetizable material with intervening thin pieces of an adherent insulating bond interposed between the thin magnetizable pieces, each intervening thin bonding-piece adhering to the adjacent magnetizable pieces between which it is disposed whereby the bundle of magnetizable pieces is solidly held together to constitute one of the U-shaped pieces of the core, each magnetizable piece extending continuously from end to end of its U-shaped piece, each magnetizable piece being bent at the bends in the U, each of the ends of each of the U-shaped pieces being a mechanically worked, accurately smooth, butt-joint surface comprising a plurality of smooth-surfaced ends of said thin magnetizable pieces separated by said bonding-pieces, each of said butt-joint surfaces being so etched as to be free of substantially all burrs or particles of magnetizable material extending across the intervening bonding-pieces at said butt-joint surface, so that the smooth-surfaced ends of said thin magnetizable pieces are insulated from each other in each accurately smooth butt-joint surface of each U-shaped core-piece, each of said accurately smooth butt-joint surfaces of each U-shaped core-piece cooperating with a corresponding butt-joint surface of the other U-shaped core-piece of the continuous magnetic loop to provide a closely fitting butt joint.

JOHN B. SEASTONE.
CLIFFORD C. HORSTMAN.